United States Patent
Wei et al.

(10) Patent No.: US 8,244,778 B1
(45) Date of Patent: Aug. 14, 2012

(54) CUSTOMIZATION OF TYPES USING DEFAULT ASPECTS

(75) Inventors: Shu-Shang Sam Wei, Danville, CA (US); Roger W. Kilday, Livermore, CA (US); Victor Spivak, San Mateo, CA (US); Meir Amiel, Pleasanton, CA (US); Venkat Chandrasekaran, Newark, CA (US); Yik-Ping Li, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 933 days.

(21) Appl. No.: 12/005,157

(22) Filed: Dec. 21, 2007

(51) Int. Cl.
*G06F 7/00* (2006.01)
*G06F 17/30* (2006.01)

(52) U.S. Cl. ......................... 707/803
(58) Field of Classification Search ............ 707/803, 707/999.1
See application file for complete search history.

(56) References Cited

U.S. PATENT DOCUMENTS

| | | | |
|---|---|---|---|
| 6,119,130 A * | 9/2000 | Nguyen et al. | 707/695 |
| 2005/0071345 A1* | 3/2005 | Lin | 707/100 |
| 2006/0036656 A1* | 2/2006 | Mercer | 707/203 |

* cited by examiner

*Primary Examiner* — Aleksandr Kerzhner
(74) *Attorney, Agent, or Firm* — Van Pelt, Yi & James LLP

(57) ABSTRACT

Managing stored content is disclosed. It is determined that a new or modified attribute is to be associated with future-created instances of an object type but not with at least some previously-created instances of the object type. A default intra-type customization that associates the new or modified attribute with future-created instances of the object type, in a manner that results in the new or modified attribute being stored in a database structure that is separate from a type-specific structure configured to store one or more type-based attributes common to both the at least some previously-created and future-created instances of the object type, is associated with the object type.

15 Claims, 10 Drawing Sheets

702 ⬋

| Obj_id | Attr1 | Attr2 | Attr3 |
|---|---|---|---|
| B1 | | | ASP1-B1 |
| B2 | | | ASP1-B2 |
| B3 | | | ASP1-B3 |
| B4 | | | ASP2-B4 |
| B5 | | | ASP2-B5 |

| Obj_id | Asp_Attr1 |
|---|---|
| ASP1-B1 | |
| ASP1-B2 | |
| ASP1-B3 | |

1002

| Obj_id | Asp_Attr1 | Asp_Attr2 |
|---|---|---|
| ASP2-B4 | | |
| ASP2-B5 | | |

CUSTOMIZATION OF TYPES USING DEFAULT ASPECTS

BACKGROUND OF THE INVENTION

Content management solutions facilitate the creation, storage, retrieval, promotion (e.g., through a review/approval and/or other business process or work flow), retention, migration, and/or destruction of content, typically in the context of a relatively large body of content. A content management system typically uses a database, such as a relational database management system (RDBMS), to store metadata associated with content items (e.g., documents or other files or objects) under management of the content management system. In a typical content management system, content items of a particular type may be represented in metadata by a metadata object of a corresponding type, instances of which share methods and/or attributes applicable to content items of that type. For example, a base class "document" may be sub-classed to create a sub-class for documents that are "contracts". The sub-class may have attributes, such as "contract termination date", that do not apply to other types of document. Such a type may be further sub-classed, for example to create a type corresponding to a particular type of contract, such as "lease". In a typical content management system, attributes of object instances of a particular type may be stored in a single database table. If a type is changed in a manner that adds a new attribute or modifies a characteristic of an existing attribute, typically database schema changes are required to reflect the change, including with respect to existing instances, even if the existing instances do not have a value for any new and/or modified attributes.

BRIEF DESCRIPTION OF THE DRAWINGS

Various embodiments of the invention are disclosed in the following detailed description and the accompanying drawings.

FIG. 10 is a block diagram illustrating an example of database structures used to customize and effectively version type-based content objects using default aspects in an embodiment.

DETAILED DESCRIPTION

Figure 1:
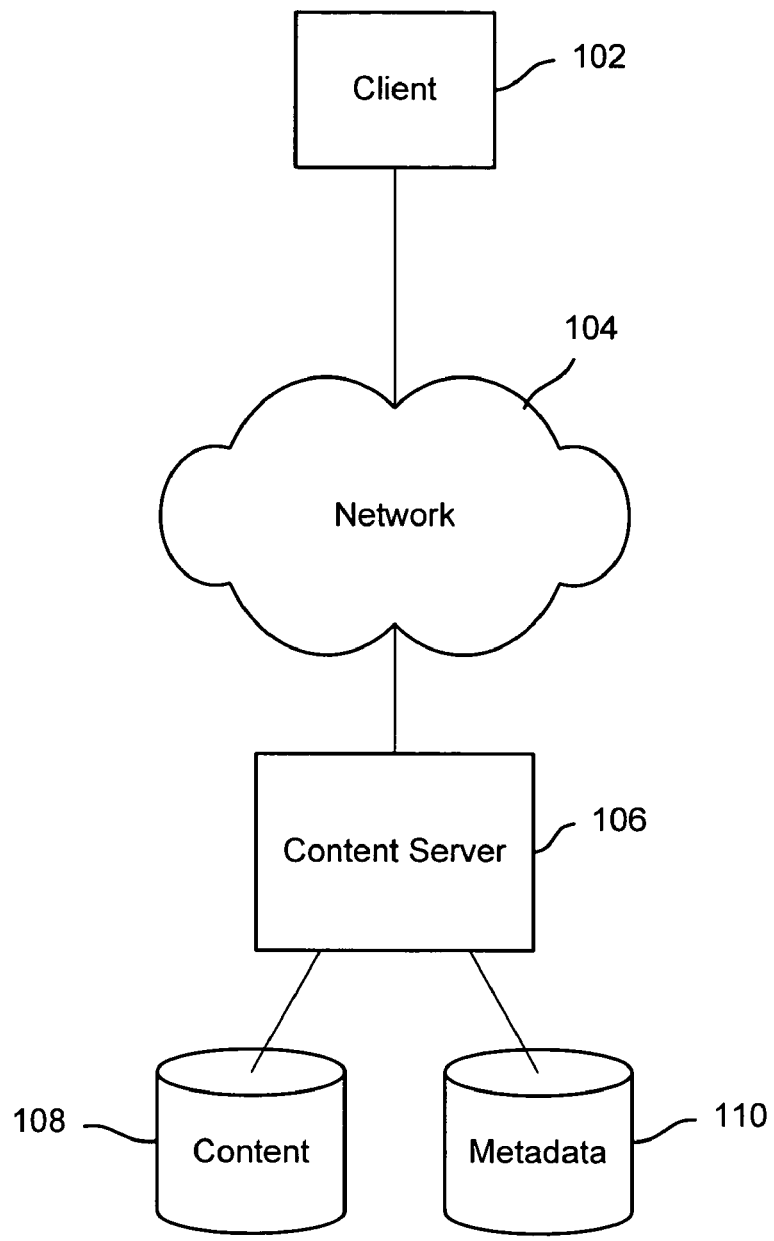
FIG. 1 is a block diagram illustrating an embodiment of a content management system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using default customization of object instances within a content object type to effectively create different versions of a type without requiring modification of existing instances and database structures (e.g., tables) associated with such existing instances is disclosed. In some embodiments, one or more default aspects are associated with a content object type. The default aspects are "attached" to an instance of the content object type in connection with creation of the instance. In some embodiments, attachment of an aspect to an instance of a type-based content object results in the object instance being modified, e.g., to add or modify one or more methods and/or associated attributes, without affecting other instances of the object type. In some embodiments, to create a new/modified version of a type-based content object, the type itself is not changed, thereby avoiding the need to change an associated database schema, e.g., to add or modify columns to accommodate added or changed attributes. Instead, one or more default aspects are added, modified, and/or replaced to add/change the methods and/or attributes as desired. The added/changed attributes associated with the default aspect(s), referred to sometimes herein as "aspect attributes", in some embodiments are stored in a separate database structure, e.g., a separate table, such that no changes are required in the type-specific table (or other structure). In this way, different versions of a type-based object may co-exist without requiring changes to the database schema and/or structures associated with preexisting instances of the content object type.

FIG. 1 is a block diagram illustrating an embodiment of a content management system. One more clients 102 connect via a network 104 to a content server 106 configured to manage and provide access to body of content stored in a content store 108. For each content item in content store 108, corresponding metadata is stored in a metadata store 110. In some embodiments, each content item in content store 108 is represented in metadata stored in metadata store 110 by one or more objects configured to provide content management related functionality with respect to the content item. Data comprising each metadata object is stored in some embodiments in one or more database table, e.g., in a relational database management system (RDBMS). In some embodiments a content management client on client 102 communicates with content server 106 via network 104 to make content management related services available to applications running on client 102. In some embodiments, client applications on client 102 use a content management framework associated with the content management client to access content management related services. For example, such a client application may be configured to store a new content item (e.g., a document or other object) by invoking the content management client (or the server 106 directly) to create and save a new object, e.g., a new object configured and/or usable to save in content store 108 content data comprising the content item and/or to represent the content item in metadata 110. Similarly, to retrieve data, a client application and/or content management client would communicate with content server 106 via network 104. The client 102 may provide, for example, an identifier associated with a particular content item and/or one or more search criteria, such as a query to search for items created by a particular author on a specified date. In the case of retrieval of a specified content item, the content server 106 would use the provided identifier to retrieve the content item from the content store 108 and provide it to the client 102 via network 104. In the case of a query, the content server 106 would query database 110 to identify responsive objects. In some embodiments, metadata associated with responsive objects is sent via network 104 to client 102 where a user and/or process may select one or more responsive objects for retrieval.

Figure 2:
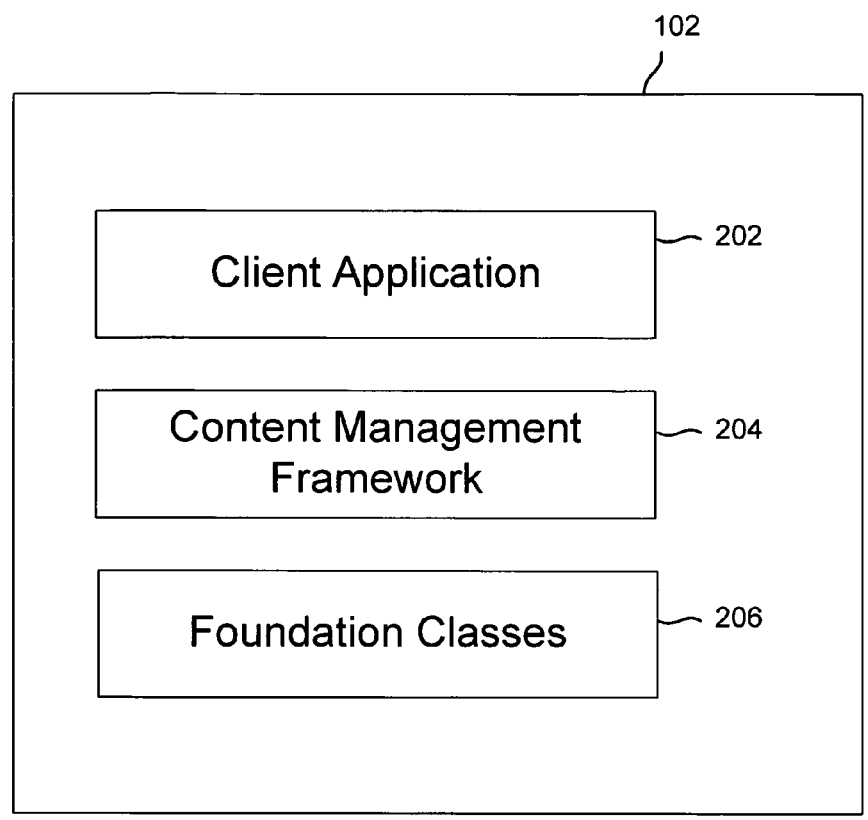
FIG. 2 is a block diagram illustrating an embodiment of a client system. In the example shown, client 102 includes a client application 202 running on a content management framework 204 that has associated with it a set of foundation classes 206.

FIG. 2 is a block diagram illustrating an embodiment of a client system. In the example shown, client 102 includes a client application 202 running on a content management framework 204 that has associated with it a set of foundation classes 206. The client application 202 is configured to invoke methods and components of content management framework 204 to perform content management related operations, e.g., to add a content item to a body of managed content, retrieve and/or modify a previously stored content item, locate content items that satisfy a search query, etc. In some embodiments, to perform certain tasks the content management framework 204 may instantiate objects based on one or more classes comprising foundation classes 206, e.g., to create, populate, and provide to a remote content server an instance of a content object configured to represent in a body of metadata a content item being added to a body of managed content.

Figure 3:
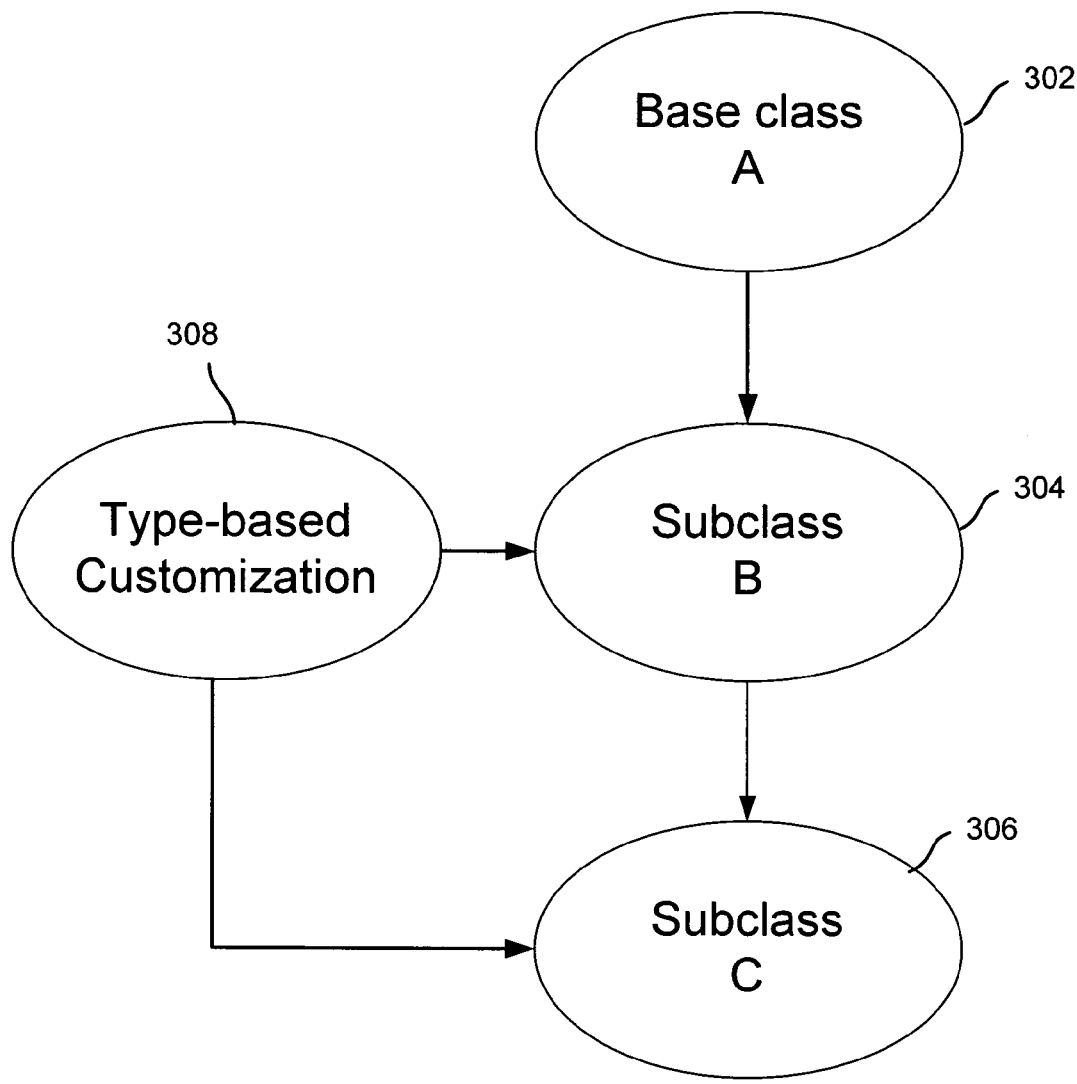
FIG. 3 illustrates type-based customization of objects in an embodiment of a content management system.

FIG. 3 illustrates type-based customization of objects in an embodiment of a content management system. In the example shown, a base class 302 has been sub-classed to create a subclass 304, which in turn has been sub-classed to create a subclass 306. As is typical in an object oriented environment, the subclass 304 inherits the methods and attributes of the base class 302, and likewise the subclass 306 inherits the methods and attributes of subclass 304 (include those inherited by subclass 304 from the base class 302). In this example, a type-based customization 308 is associated with subclass 304 and as a result is applied to instances of subclass 304 and instances of subclass 306. An example of a type-based customization is a requirement that an object of a type with which the type-based customization is associated must have a name that satisfies a certain naming convention, for example one that prescribes a number or type of characters, etc. In some embodiments, type-based customization is implemented by replacing the standard "save" function with a customized method that executes and/or enforces any type-specific behaviors and/or requirements prior to and/or otherwise in connection with saving an instance of the type. In some embodiments, attributes of content objects of a particular type are stored in a database table or other structure associated with the type.

In some embodiments, individual instances of an object type may be customized further (i.e., provided with methods and/or attributes not incorporated into other objects of the same type) by "attaching" to such objects one or more "aspects". As used herein in connection with content objects configured to represent a content item in a body of metadata and/or perform or otherwise provide content management related functionality with respect to such a content item, the term "aspect" refers to an instance, as opposed to type, specific customization that is applied to an instance of an object. Attaching an aspect may result in an instance having one or both of methods and/or attributes that are not present in one or more other objects of the same type. An example of a use of such an aspect is attaching to an instance of an object, e.g., upon its being associated with a folder, container, or other logical storage location, a logical storage location specific retention policy. In some embodiments, attachment of an aspect results in modifications being made to the object instance to provide the methods and/or attributes associated with the aspect. In some embodiments, a content object to which an aspect has been attached includes a pointer to an aspect object configured to provide the methods and/or attributes associated with the aspect. In some embodiments, aspect-associated attributes are stored persistently in a location that is separate from type-based attributes (i.e., attributes common to all instances of objects of a particular type), for example in a separate, aspect-specific database table. In some embodiments, one or more "default" aspects may be defined for a particular type. Upon creation of an instance of an object of the type the default aspect(s), along with any other aspects that may be indicated to be attached at instantiation, is/are attached.

Figure 4:
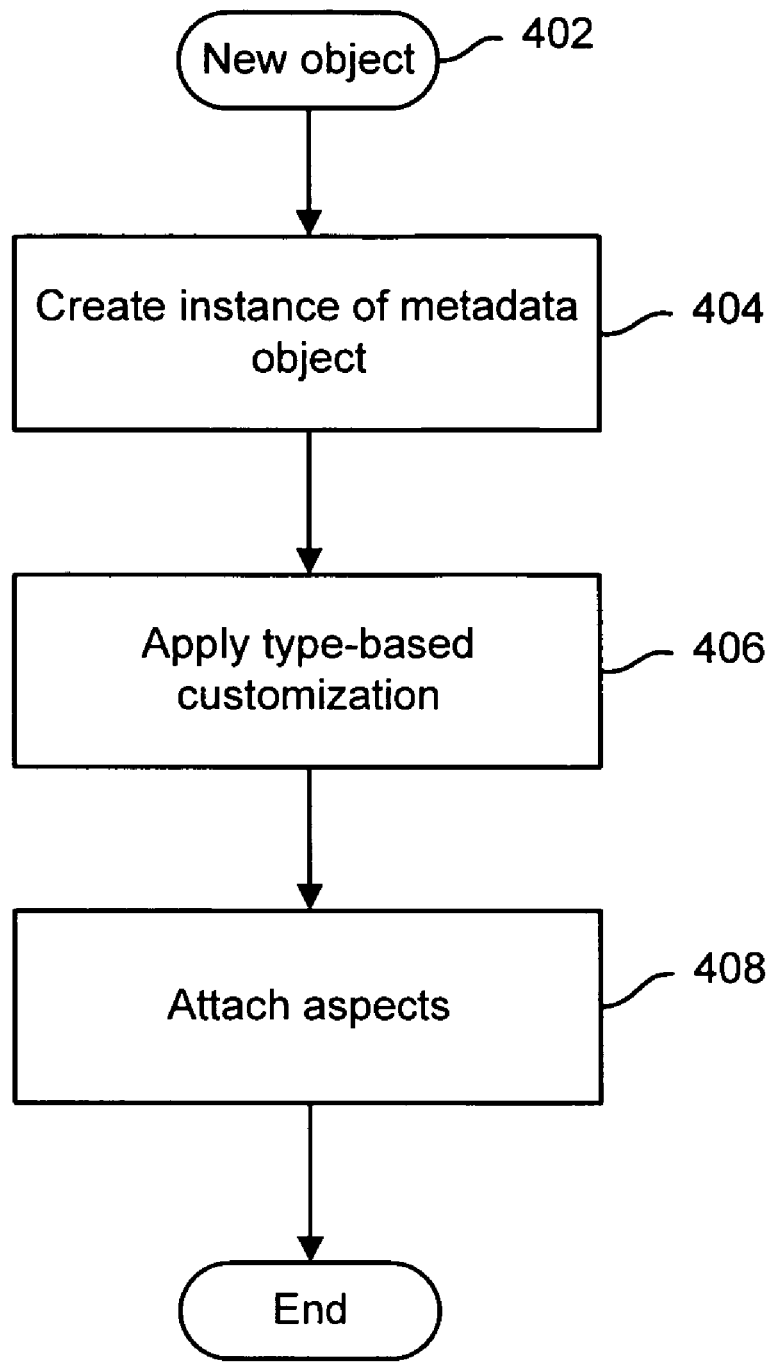
FIG. 4 is a flow chart illustrating an embodiment of a process for creating an instance of a type-based object.

FIG. 4 is a flow chart illustrating an embodiment of a process for creating an instance of a type-based object. When a new instance of a type-based object is to be created (402), an object instance is generated based on the class (or more commonly subclass) definition (404). Any type-based customizations are applied (406). Aspects, including any default aspects, are attached (408).

Figure 5:
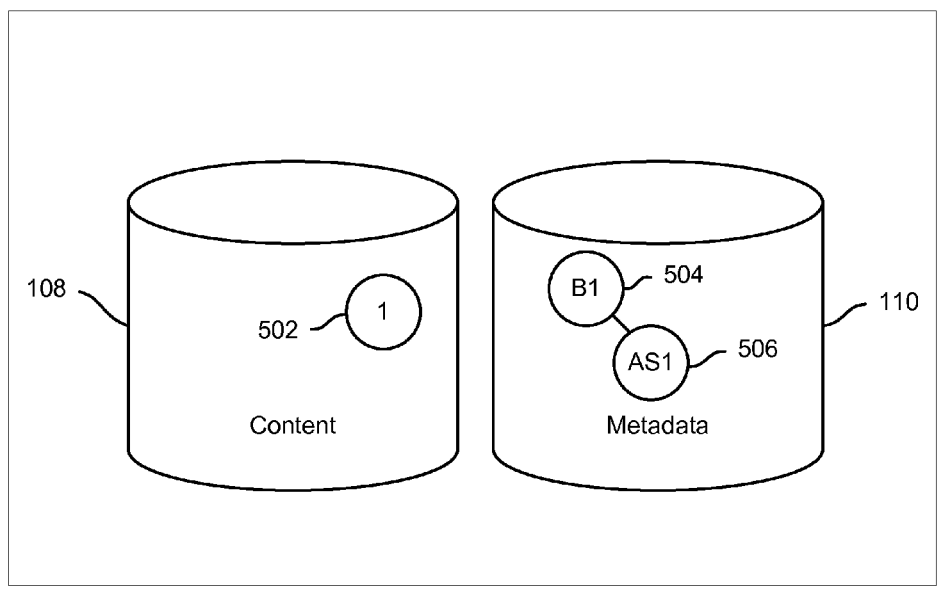
FIG. 5 illustrates an example of a type-based object to which an aspect has been attached.

FIG. 5 illustrates an example of a type-based object to which an aspect has been attached. In the example shown, a content item (502) is represented in metadata (110) by a type-based content (metadata) object (504) to which an aspect represented by aspect object "AS1" (506) has been attached. The content object (504) includes a pointer, identifier, or other attribute that associates the aspect object (506) with the type-based content object (504), as described more fully below.

Figure 6:
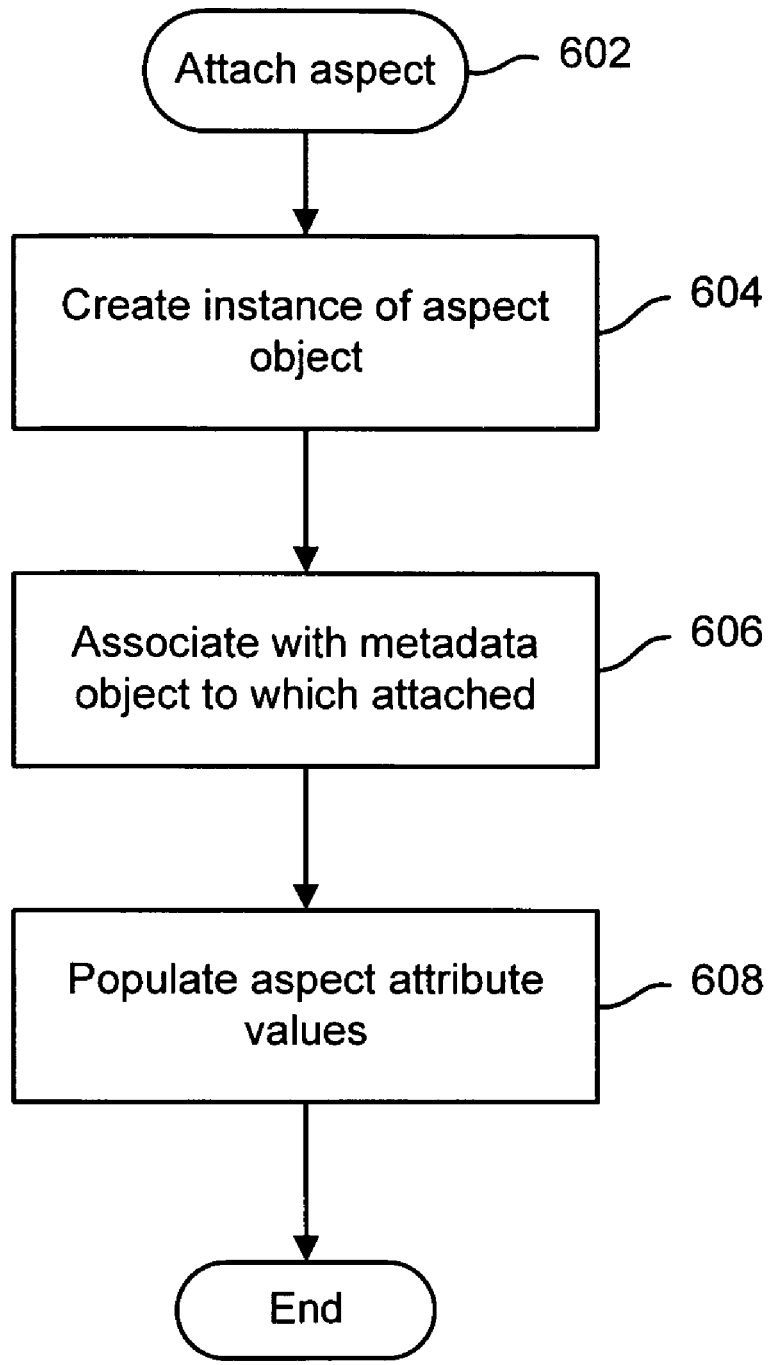
FIG. 6 is a flow chart illustrating an embodiment of a process for attaching an aspect to a content object.

FIG. 6 is a flow chart illustrating an embodiment of a process for attaching an aspect to a content object. In some embodiments, the process of FIG. 6 is used to implement step 408 of FIG. 4. An indication is received that an aspect is to be attached (602). An instance of an aspect object, such as aspect object 506 of FIG. 5, is created (604). In some embodiments, if an existing aspect object was created previously the existing aspect object may be used, in which case 604 is omitted. The aspect object is associated with the content (metadata) object to which it is to be attached (606), e.g., by setting as the value of an attribute of the content object a pointer, identifier, or other value associated with the aspect object. Attributes of the aspect object are populated (608). In some embodiments, attributes of the aspect object (i.e., aspect attributes) are stored in a database table or other structure that is separate from a table used to store attributes common to all instances of a type-based object of which the content object to which the aspect has been attached is an instance.

Figure 7:
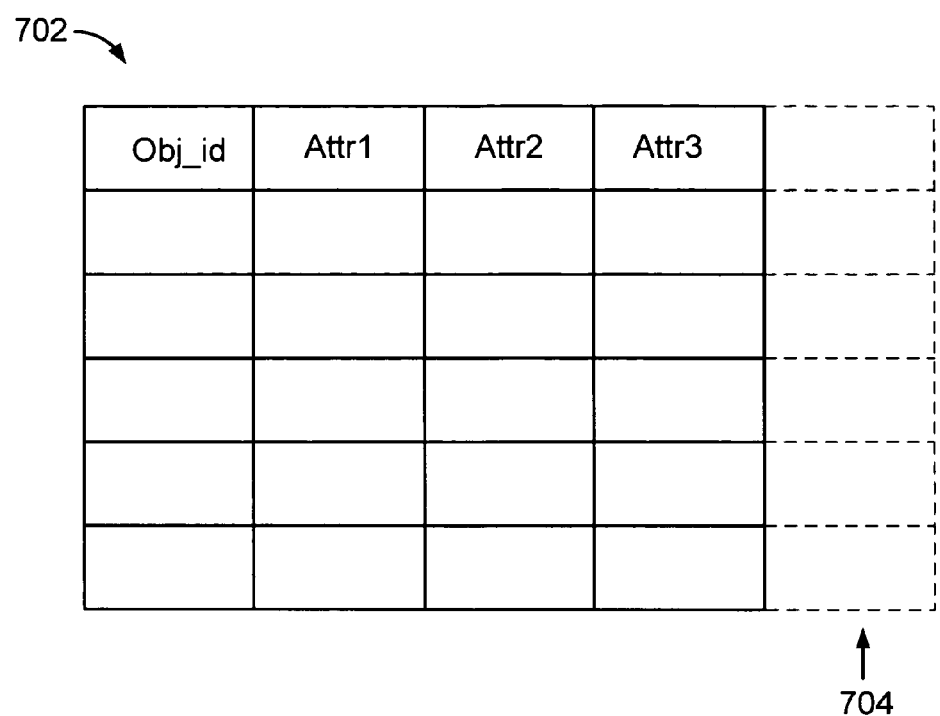
FIG. 7 is a block diagram illustrating an embodiment of a database table for storing content object attributes.

FIG. 7 is a block diagram illustrating an embodiment of a database table for storing content object attributes. In the example shown, the table 702 includes a plurality of rows and columns. In some embodiments, each content object whose attributes are stored in the table 702 has a corresponding one or more rows in the table 702. In some embodiments, a first table is used to store single occurrence variables and a second, separate table used to store repeating variables. In some embodiments the table 702 is used to store attributes of content objects of a particular type with which the table 702 is associated. In a typical prior art system modification of a type-based object definition, e.g., to add a fourth attribute, one would have to modify the database schema to provide for an additional column, as illustrated in FIG. 7 by the column 704 shown in dashed lines. Typically such a change would consume scarce CPU cycles and time, as rows associated with preexisting instances of the object type with which the table 702 is associated are update; even though such preexisting instances may not have or require storage of a value for the newly added attribute.

Adding or changing default aspects as a mechanism for effectively creating a new version of an object type without modifying the type definition is disclosed. By storing aspect attributes in a separate table or other structure and effecting changes to the methods and/or attributes of subsequently created type-based by adding or changing default aspects, instead of changing the type definition, the need to update potentially millions of preexisting records is avoided.

Figure 8:
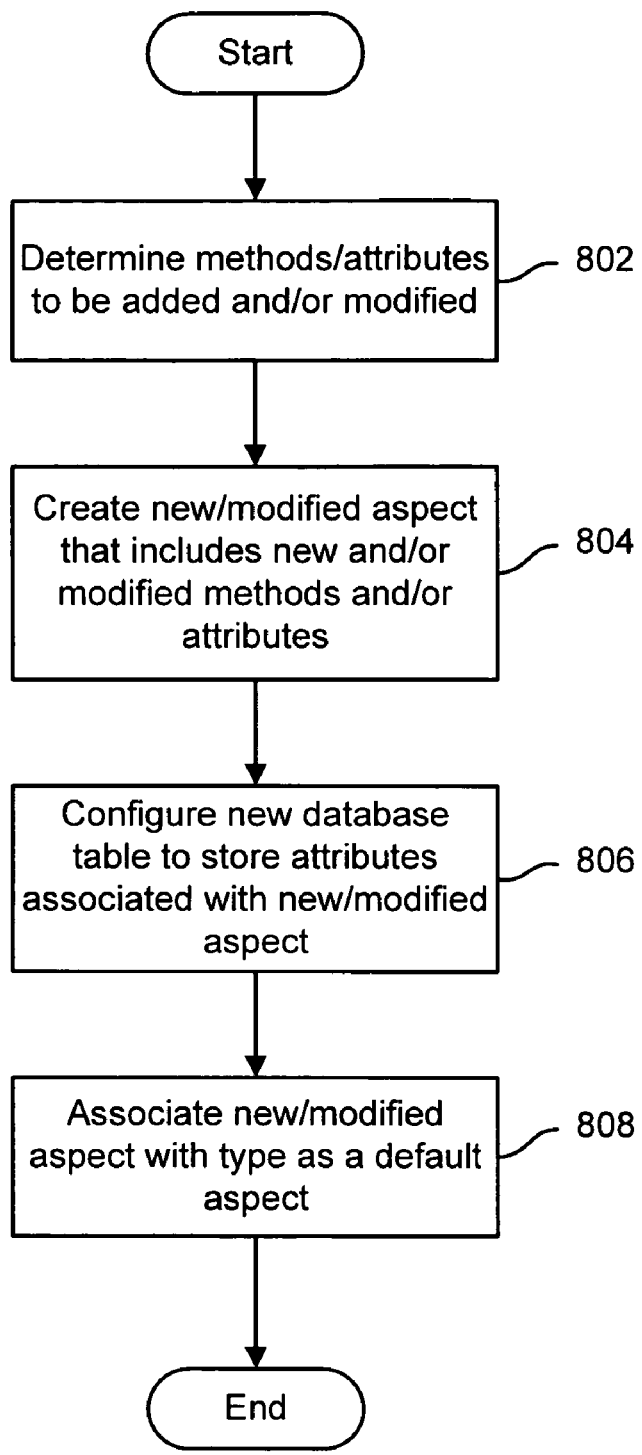
FIG. 8 is a flow chart illustrating an embodiment of a process for using default aspects to customize and effectively version type-based content objects.

FIG. 8 is a flow chart illustrating an embodiment of a process for using default aspects to customize and effectively version type-based content objects. The methods and/or attributes desired to be added and/or modified are determined (802). A new/modified aspect that implements the desired methods and/or attributes is created (804). A new database table or other structure is created to store aspect attributes associated with the new/modified aspect (806). In some embodiments, a new database table or other structure is not necessarily created at step 806. Instead, one or more columns (as required, depending on the number of new attributes) are added to an aspect attribute specific table. Doing so may require that existing instances of the type to which the subsequently modified aspect were attached previously be updated, for example lazily, to populate with a value the newly added attribute. Such an approach may be desirable, for example, in cases where the aspect that has been modified was not attached previously to a prohibitive number of instances of the type and/or such existing instance are expected and/or required to have a value for the newly added aspect attribute. In some embodiments, a programmer or other user adding the new aspect attribute determines whether update of existing instances of the type to which the aspect that is to be modified (or replaced) was attached previously should be updated to include the aspect; if so, a column is added to the existing table, otherwise a new table is created. Considerations such as how many instances would have to be updated to add a value for the new attribute, whether the new attribute has or requires a value for such instances, etc., are weighed in various embodiments to determine whether a column should be added to an existing aspect table or instead a new table created and associated with the modified aspect. Referring further to FIG. 8, the new/modified aspect is associated, as a default aspect, with the content object type being customized (effectively versioned) (808). Subsequently created instances of the type-based content object will have the new/modified aspect attached, as described above, and any associated aspect attributes stored in the newly created database table or other structure, thereby avoiding the need to modify the database schema and/or update potentially millions of preexisting records to reflect the change implemented via the process of FIG. 8.

Figure 9:
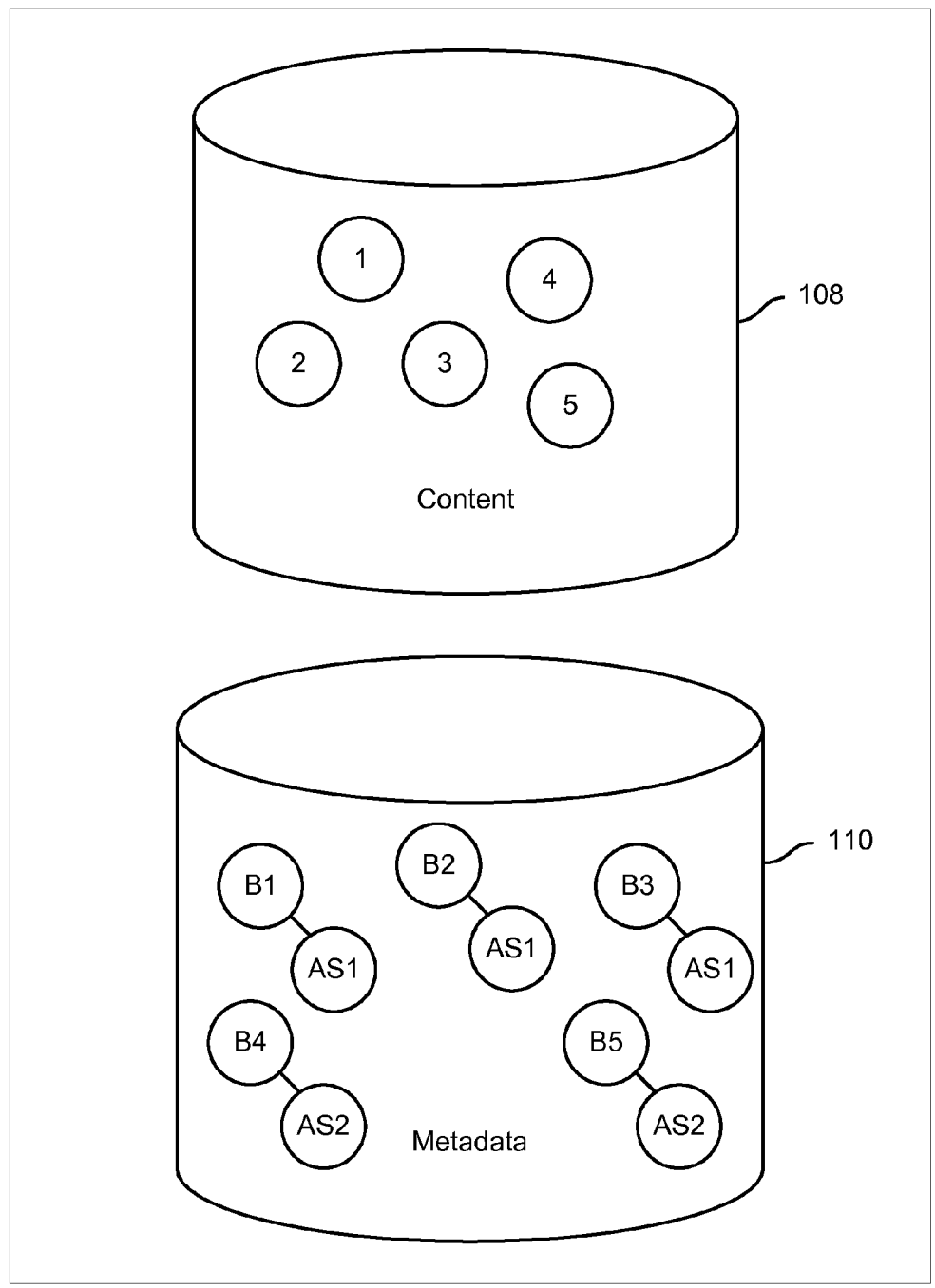
FIG. 9 is a block diagram illustrating an example of using default aspects to customize and effectively version type-based content objects in an embodiment.

FIG. 9 is a block diagram illustrating an example of using default aspects to customize and effectively version type-based content objects in an embodiment. In the example shown, five content items (numbered "1" to "5") of a type "B" are shown as having been added to a body of managed content stored in content store 108 of FIG. 1. Each is represented in metadata stored in metadata store 110 by a corresponding type-based content object (numbered "B1" to "B5", respectively) associated with the content type "B". The first three content objects have had attached to them a first default aspect, as represented in FIG. 9 by the aspect objects "AS1". Subsequent to the first three content items and associated objects being added, a new intra-type customization (i.e., default aspect) was created and replaced the original aspect, as represented in FIG. 9 by the aspect objects "AS2" associated with subsequently created content objects "B4" and "B5". For example, the new default aspect may in some embodiments be defined to enable an additional and/or modified attribute to be associated with subsequently created instances of the type-based content objects of type "B", without requiring modification of preexisting records.

FIG. 10 is a block diagram illustrating an example of database structures used to customize and effectively version type-based content objects using default aspects in an embodiment. In the example shown, a type-based object table 702 is used to store attributes common to all instances of a particular type of content object, in this example objects of the content object type "B", of which there are five in this example. The first three objects of type "B" have pointers to entries in a first aspect attribute table 1002 associated with a first default aspect (values of the type-based and aspect attributes are not shown but would be stored in the locations shown). The fourth and fifth instances of content objects of the type "B" point instead to entries in a second aspect attribute table 1004 that includes both the original aspect attribute "Asp_Attr1" of table 1002 and in addition a new attribute, stored in an additional column 1006, labeled "Asp_Attr2". In this manner, instances of content objects of type "B" that were created after definition of the added/modified default aspect with which table 1004 is associated have a location to store the added aspect attribute "Asp_Attr2", without requiring an change to the type definition or the database schema is it relates to the type-specific table 702, and without requiring any update or other manipulation of preexisting records.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing content, comprising:
   determining that a new or modified attribute is to be associated with future-created instances of an object type but not with at least some previously-created instances of the object type; and
   associating with the object type a default intra-type customization that associates the new or modified attribute with future-created instances of the object type in a manner that results in the new or modified attribute being stored in a database structure that is separate from a type-specific structure configured to store one or more type-based attributes common to both the at least some previously-created and future-created instances of the object type, wherein storing the new or modified attribute in the database structure that is separate from the type-specific structure results in the future-created instances being modified without affecting the at least some previously-created instances of the object type, wherein associating with the object type the default intra-type customization does not include modifying a definition associated with the object type.

2. The method of claim 1, wherein associating with the object type a default intra-type customization comprises configuring an aspect that includes the new or modified attribute and associating the aspect with the object type.

3. The method of claim 2, wherein associating the aspect with the object type comprises configuring the aspect as a default aspect of the object type.

4. The method of claim 1, wherein the database structure comprises a database table that is separate from a type-specific database table configured to store said one or more type-based attributes.

5. The method of claim 1, wherein the default intra-type customization is applied to each future-created instance of the object type in connection with the creation of each such instance.

6. A content management system, comprising:
a processor configured to:
determine that a new or modified attribute is to be associated with future-created instances of an object type but not with at least some previously-created instances of the object type; and
associate with the object type a default intra-type customization that associates the new or modified attribute with future-created instances of the object type in a manner that results in the new or modified attribute being stored in a database structure that is separate from a type-specific structure configured to store one or more type-based attributes common to both the at least some previously-created and future-created instances of the object type, wherein storing the new or modified attribute in the database structure that is separate from the type-specific structure results in the future-created instances being modified without affecting the at least some previously-created instances of the object type, wherein associating with the object type the default intra-type customization does not include modifying a definition associated with the object type; and
a storage coupled to the processor and configured to store said database structure and said type-specific structure.

7. The system recited in claim 6, wherein the processor is configured to associate the default intra-type customization with the object type at least in part by configuring an aspect that includes the new or modified attribute and associating the aspect with the object type.

8. The system recited in claim 7, wherein associating the aspect with the object type comprises configuring the aspect as a default aspect of the object type.

9. The system recited in claim 6, wherein the database structure comprises a database table that is separate from a type-specific database table configured to store said one or more type-based attributes.

10. The system recited in claim 6, wherein the default intra-type customization is applied to each future-created instance of the object type in connection with the creation of each such instance.

11. A computer program product for managing content, the computer program product being embodied in a non-transitory computer readable medium and comprising computer instructions for:
determining that a new or modified attribute is to be associated with future-created instances of an object type but not with at least some previously-created instances of the object type; and
associating with the object type a default intra-type customization that associates the new or modified attribute with future-created instances of the object type in a manner that results in the new or modified attribute being stored in a database structure that is separate from a type-specific structure configured to store one or more type-based attributes common to both the at least some previously-created and future-created instances of the object type, wherein storing the new or modified attribute in the database structure that is separate from the type-specific structure results in the future-created instances being modified without affecting the at least some previously-created instances of the object type, wherein associating with the object type the default intra-type customization does not include modifying a definition associated with the object type.

12. The computer program product recited in claim 11, wherein associating with the object type a default intra-type customization comprises configuring an aspect that includes the new or modified attribute and associating the aspect with the object type.

13. The computer program product recited in claim 12, wherein associating the aspect with the object type comprises configuring the aspect as a default aspect of the object type.

14. The computer program product recited in claim 11, wherein the database structure comprises a database table that is separate from a type-specific database table configured to store said one or more type-based attributes.

15. The computer program product recited in claim 11, wherein the default intra-type customization is applied to each future-created instance of the object type in connection with the creation of each such instance.

* * * * *